(12) United States Patent
Forkey et al.

(10) Patent No.: US 11,598,925 B2
(45) Date of Patent: Mar. 7, 2023

(54) OPTICAL FIBER CONNECTOR

(71) Applicant: Precision Optics Corporation, Inc., Gardner, MA (US)

(72) Inventors: Joseph N. Forkey, Princeton, MA (US); Bruce M. Radl, Stow, MA (US)

(73) Assignee: Precision Optics Corporation, Inc., Gardner, MA (US)

( * ) Notice: Subject to any disclaimer, the term of this patent is extended or adjusted under 35 U.S.C. 154(b) by 0 days.

(21) Appl. No.: 17/161,091

(22) Filed: Jan. 28, 2021

(65) Prior Publication Data
US 2021/0239916 A1    Aug. 5, 2021

Related U.S. Application Data

(60) Provisional application No. 62/968,263, filed on Jan. 31, 2020.

(51) Int. Cl.
*G02B 6/38* (2006.01)
*G02B 6/42* (2006.01)

(52) U.S. Cl.
CPC ......... *G02B 6/3891* (2013.01); *G02B 6/3809* (2013.01); *G02B 6/4292* (2013.01)

(58) Field of Classification Search
None
See application file for complete search history.

(56) References Cited

U.S. PATENT DOCUMENTS

| | | | | |
|---|---|---|---|---|
| 3,861,781 | A | * 1/1975 | Hasegawa | G02B 6/3855 385/80 |
| 3,948,582 | A | 4/1976 | Martin | |
| 4,015,894 | A | 4/1977 | Rocton | |
| 4,101,197 | A | * 7/1978 | Kent | G02B 6/3865 250/227.24 |
| 4,828,353 | A | * 5/1989 | Yamaguchi | G02B 6/3816 385/74 |
| 6,626,582 | B2 | * 9/2003 | Farrar | G02B 6/3825 385/88 |
| 2009/0116791 | A1 | 5/2009 | Thyzel | |

OTHER PUBLICATIONS

"Notification of Transmittal of the International Search Report and the Written Opinion of the International Searching Authority, or the Declaration," International Filing Date: Jan. 29, 2021, International Application No. PCT/US2021/015608, Applicant: Precision Optics Corporation, Inc., dated Apr. 29, 2021, pp. 1-13.

* cited by examiner

*Primary Examiner* — Jerry Rahll
(74) *Attorney, Agent, or Firm* — Cesari and McKenna, LLP

(57) ABSTRACT

An optical fiber connector is provided. A receptacle has an angled interior surface that acts to guide an optical fiber into the correct position as a jack is inserted into the receptacle.

14 Claims, 5 Drawing Sheets

OPTICAL FIBER CONNECTOR

CROSS-REFERENCE TO RELATED APPLICATIONS

The present application claims the benefit of U.S. Provisional Patent Application Ser. No. 62/968,263, which was filed on Jan. 31, 2020, by Joseph N. Forkey et al. for OPTICAL FIBER CONNECTOR, which is hereby incorporated by reference.

BACKGROUND

Technical Field

The present invention relates to connectors and, more particularly, to connectors for use with optical fibers.

Background Information

Illustratively, connectors for attaching an optical fiber to a radiation source, or to another optical fiber, are typically made with mating surfaces. The two components of a connector are herein referred to as the receptacle and the jack. In conventional connections, both portions of the connector require equal high precision in manufacturing and tolerances. One exemplary type of connector is the SMA connector in which the receptacle has a round bore made precisely to a diameter and a centration specification around a central opening from which comes emitted radiation, such as that from a laser or from another optical fiber. The corresponding jack illustratively has a cylinder with a precise diameter to fit tightly into the bore and carries an optical fiber that is precisely centered in the cylinder so that it co-locates the optical fiber with the point of emitted radiation. This alignment occurs when the jack is inserted into the bore of the receptacle. If either of the components is out of tolerance, a misalignment may result between the emitted radiation and the optical fiber.

The SMA connector is very common in the fiber-optic industry and it is accepted as a standard coupling method for optical fibers. However, as both components of the connector are required to be made with high precision, both are relatively expensive. When utilized with accessories that are disposable, the high cost of the precise machining of the jack is a noted disadvantage. For example, if a probe that is utilized for a medical procedure is designed for single use, i.e., disposable, the increased cost of having a high precision jack increases the overall cost of such a disposable component. As will be appreciated by those skilled in the art, it is desirous for disposable components to be as low cost as possible.

SUMMARY

The disadvantages of the prior art are overcome by providing an optical fiber connector in accordance with various embodiments of the present invention. A high precision receptacle is operatively connected with a radiation emitter, e.g., laser or optical fiber. The receptacle has external sides that are shaped to loosely guide the sides of a low tolerance manufactured jack. The internal sides of the receptacle are angled to guide an optical fiber that extends from a bonded section in the interior of the jack. A set of exemplary latches are provided that may be closed to secure the jack in connection with the receptacle. In another embodiment, a bayonet mount is utilized to secure the jack to the receptacle.

The jack component may be manufactured with looser tolerances than the receptacle and is configured to fit around the receptacle. An optical fiber that extends from an accessory continues through the center of the jack. In operation, as a jack is inserted into the receptacle, if the jack is misaligned, the optical fiber will impact the angled sides and be guided into the proper position.

BRIEF DESCRIPTION OF THE DRAWINGS

The above and further advantages of the present invention are described in connection with the accompanying figures in which like reference numerals indicate identical or functionally similar elements, of which.

DETAILED DESCRIPTION OF AN ILLUSTRATIVE EMBODIMENT

Figure 1:
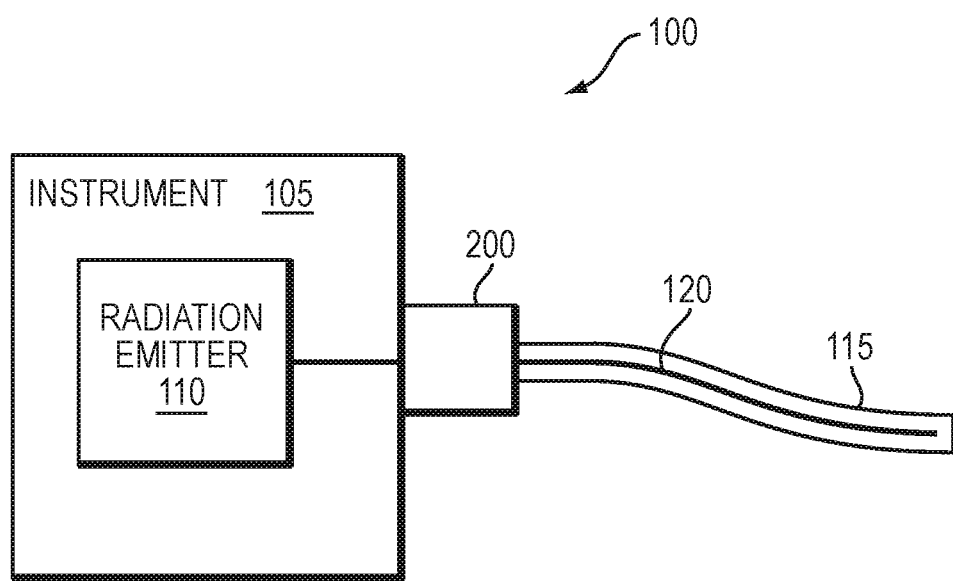
FIG. 1 is a diagram of an exemplary optical fiber system in accordance with an illustrative embodiment of the present invention.

FIG. 1 is a diagram of an exemplary instrument assembly 100 in accordance with an illustrative embodiment of the present invention. Exemplary instrument 105 includes a radiation emitter 110 as shown. Illustratively, instrument 105 may comprise a medical device, etc. In illustrative embodiments, the radiation emitter 110 may comprise a laser source with free space optics or a laser source coupled internally to an optical fiber. However, in alternative embodiments of the present invention, other types of radiation emitters maybe utilized. Therefore, the description of radiation emitter 110 being a laser should be taken as exemplary only.

An exemplary detachable accessory 115 having an optical fiber 120 is operatively interconnected with the instrument 105 by connector 200, described further below in reference to FIG. 2. Accessory 115 may comprise any detachable part that may be operatively connected with instrument 105. In accordance with an illustrative embodiment of the present invention, the accessory 115 may be disposable, i.e., it may be designed for a single use. An example of an accessory 115 is a disposable probe that transmits a laser from radiation emitter 110 through optical fiber 120 for use in medical procedures. As will be appreciated by those skilled in the art, a plurality of differing types of accessories may be utilized in accordance with alternative embodiments of the present invention.

As accessory 115 may be designed for single use, it is desirous to keep the cost of manufacturing the accessory 115 as low as possible. However, in alternative embodiments, the accessory may be designed for reuse or a limited number of uses. By utilizing a novel connector 200, as described herein, the cost of the jack for the accessory may be reduced as compared to a conventional SMA connector or other conventional optical fiber connector. This reduction in cost may be advantageous for single use applications.

Figure 2:
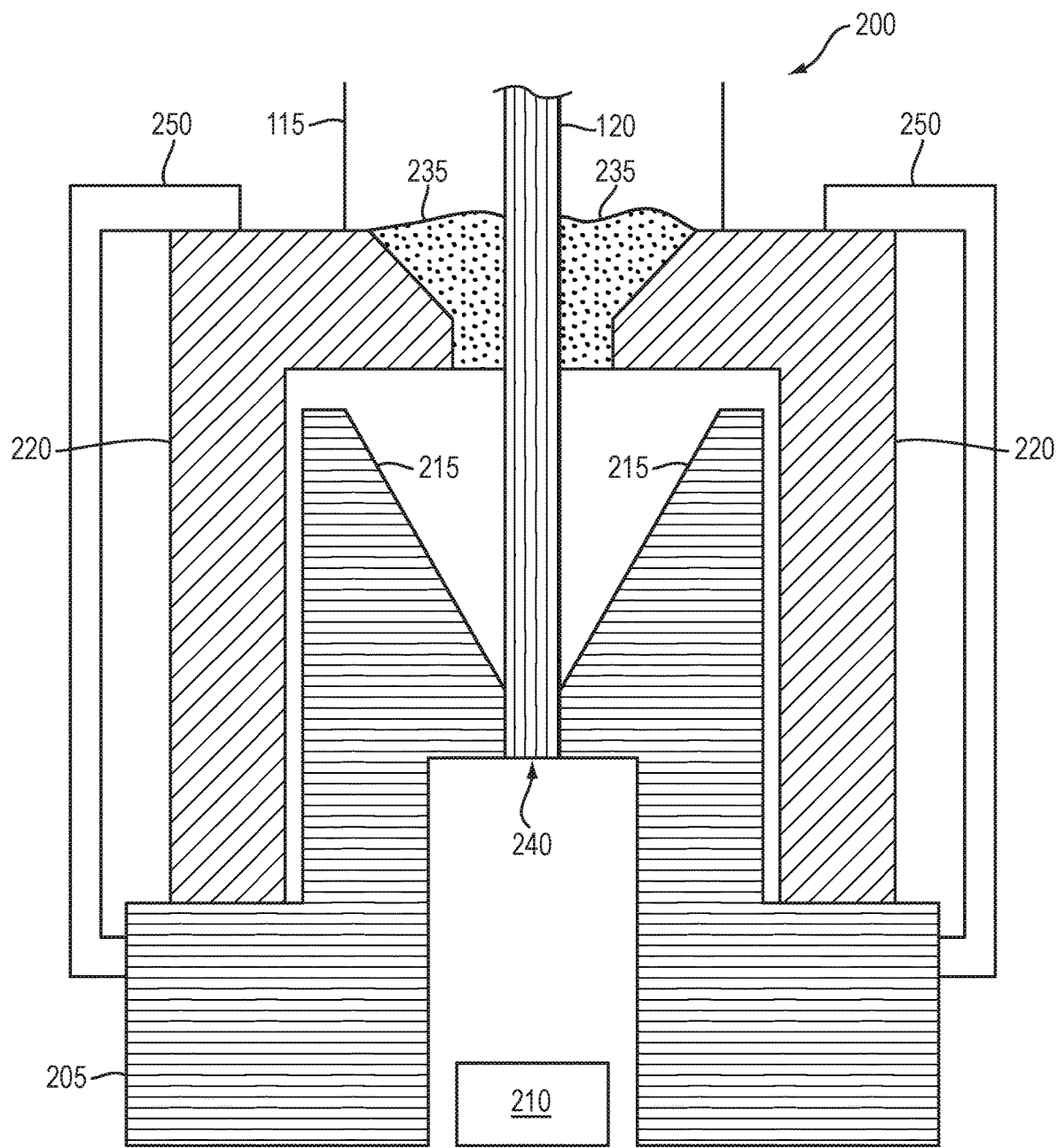
FIG. 2 is a diagram illustrating an exemplary connector in accordance with an illustrative embodiment of the present invention.

FIG. 2 is a cross-sectional diagram of an exemplary connector 200 in accordance with an illustrative embodiment of the present invention. Illustratively, the connector 200 comprises of two components, namely a receptacle 205 and a jack 220.

Illustratively, the receptacle 205 is operatively mounted on instrument 105. The receptacle 205 has an angled inner surface 215 that may be used to guide optical fiber 120 during insertion. Illustratively, the receptacle 205 is substantially circular and is machined to a very high tolerance. An internal cavity 210 provides space for radiation to be emitted up to termination point 240. In operation, it is desirous for optical fiber 120 to terminate at point 240 so that radiation that may be focused through the interior void 210 and enter the optical fiber 120 at point 240. In a first embodiment, there is no air gap between the end of optical fiber 120 and the end of the internal void 210 at point 240. In a second embodiment, there is an air gap at point 240. In a third exemplary embodiment, the end of the optical fiber 120 extends into the internal void 210. Therefore, the depiction of no air gap at point 240 in FIG. 2 should be taken as exemplary only.

A jack component 220 is illustratively mounted to the end of accessory 115. Exemplary jack component 220 may be a low precision part such as injected molded plastic component with loose tolerances. Jack 220 illustratively holds optical fiber 120 in position so that the distal end of the fiber is at point 240 when the connector 200 is in a closed position. Illustratively, a substance 235, such as an adhesive, may be utilized to bond the optical fiber 120 into place.

A set of rotatable latches 250 are shown as holding the jack 220 in place in accordance with an illustrative embodiment of the present invention. It should be noted that in accordance with alternative embodiments of the present invention, other techniques for holding the jack component in place may be utilized. In one such alternative embodiment, a bayonet mount may be utilized to hold the jack in place. As such, the description herein of clips 250 holding the jack in place should be taken as exemplary only. Illustratively, the latches 250 may be extended to an open position for insertion of the jack on the receptacle. Once the jack has been situated so that it is substantially mounted with the receptacle, the latches may be rotated to snap the jack into place. As noted above, the use of latches should be taken as exemplary only. Further, while two latches are shown in FIG. 2, any number of latches may be utilized in accordance with alternative embodiments of the present invention. More generally, any mechanism to secure the jack to the receptacle, and more particularly, the distal end of the optical fiber 120 into appropriate position 240 may be utilized in accordance with alternative embodiments of the present invention.

Figure 3:
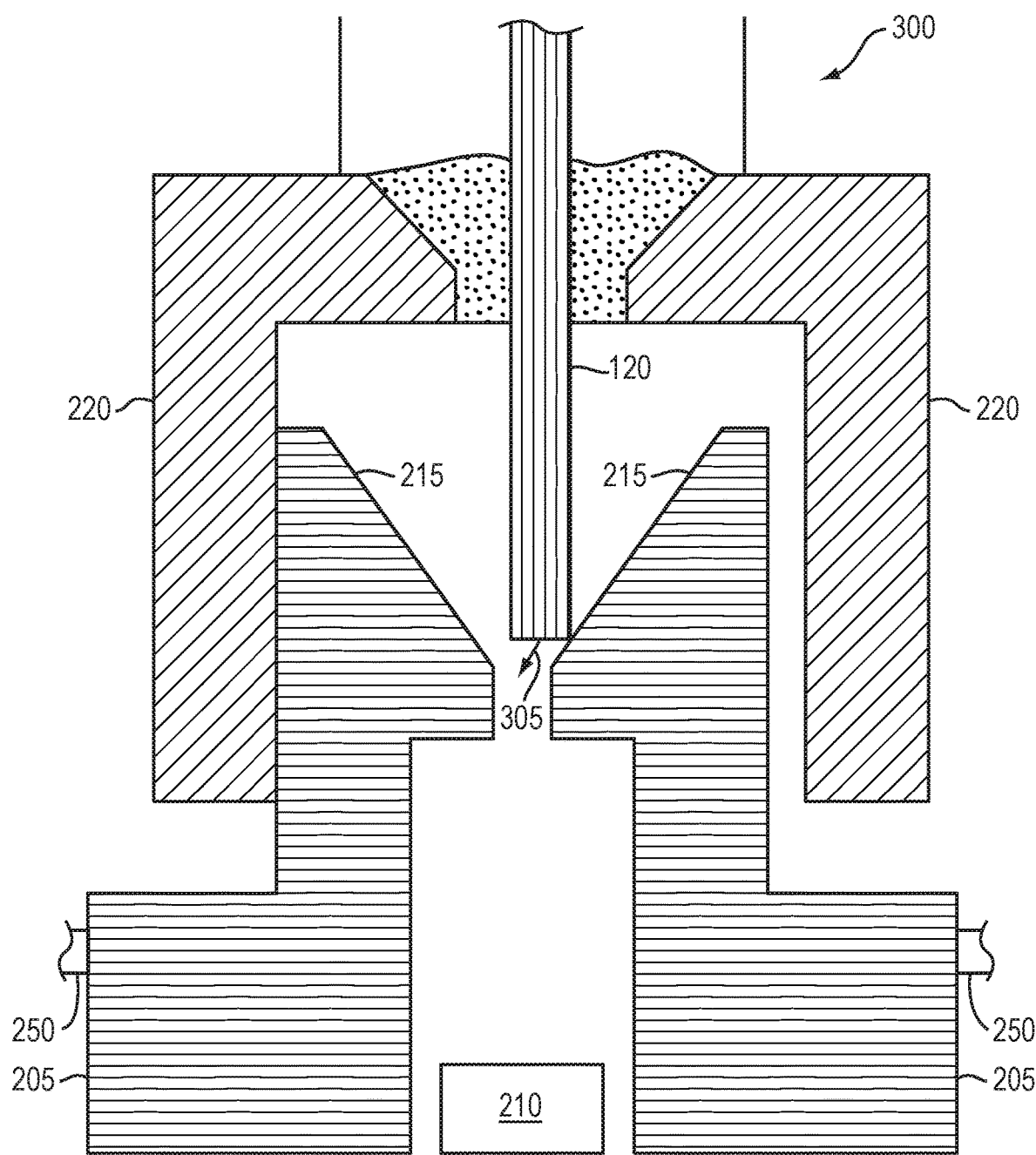
FIG. 3 is a diagram illustrating the insertion of an exemplary connector in accordance with an illustrative embodiment of the present invention.

FIG. 3 is a diagram illustrating the insertion of a jack into a receptacle in accordance with an illustrative embodiment of the present invention. As shown in diagram 300, the jack is being inserted with the optical fiber not aligned with the end point 240 of the cavity 210. However, the angled surfaces 215 of the receptacle 205 interact with the optical fiber 120 and direct the fiber into the appropriate position. In this matter, the optical fiber is self-centering by mechanical interference with the angled surfaces 215 of receptacle 205.

Figure 4:
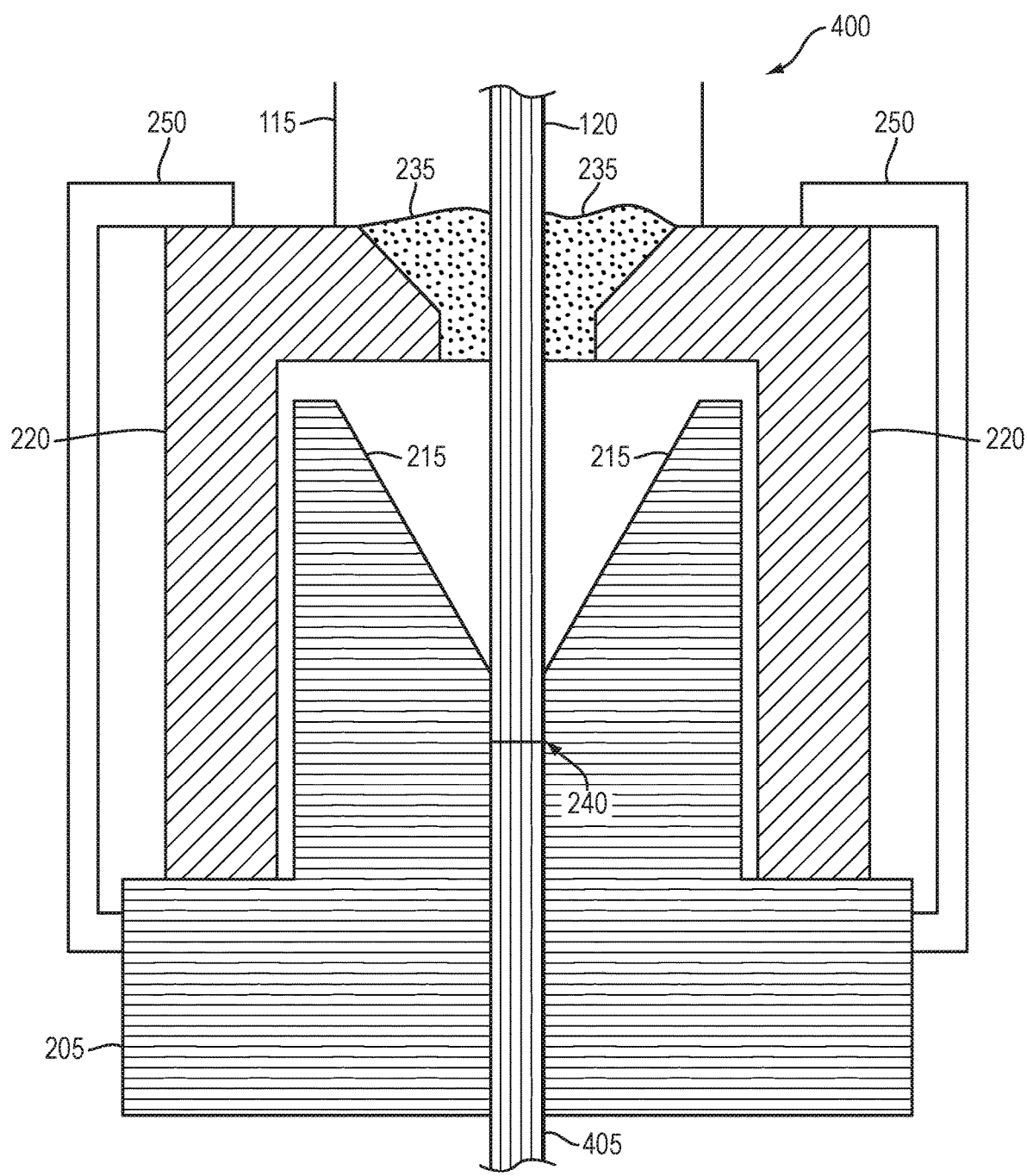
FIG. 4 is a diagram illustrating an exemplary connector being used to join two optical fibers in accordance with an illustrative embodiment of the present invention.

FIG. 4 is an exemplary diagram 400 illustrating an exemplary connector being used to join two optical fibers in accordance with an illustrative embodiment of the present invention. A novel connector as described herein may be utilized to join two optical fibers. As shown in diagram 400, a first optical fiber 120 is affixed to a jack 220, similar to that shown and described above in relation to FIGS. 2 and 3. Receptacle 205 contains a second optical fiber 405 that terminates at termination point 240. When the jack is mated with the receptacle, the end of the first optical fiber 120 is aligned with the end of the second optical fiber at termination point 240.

Figure 5:
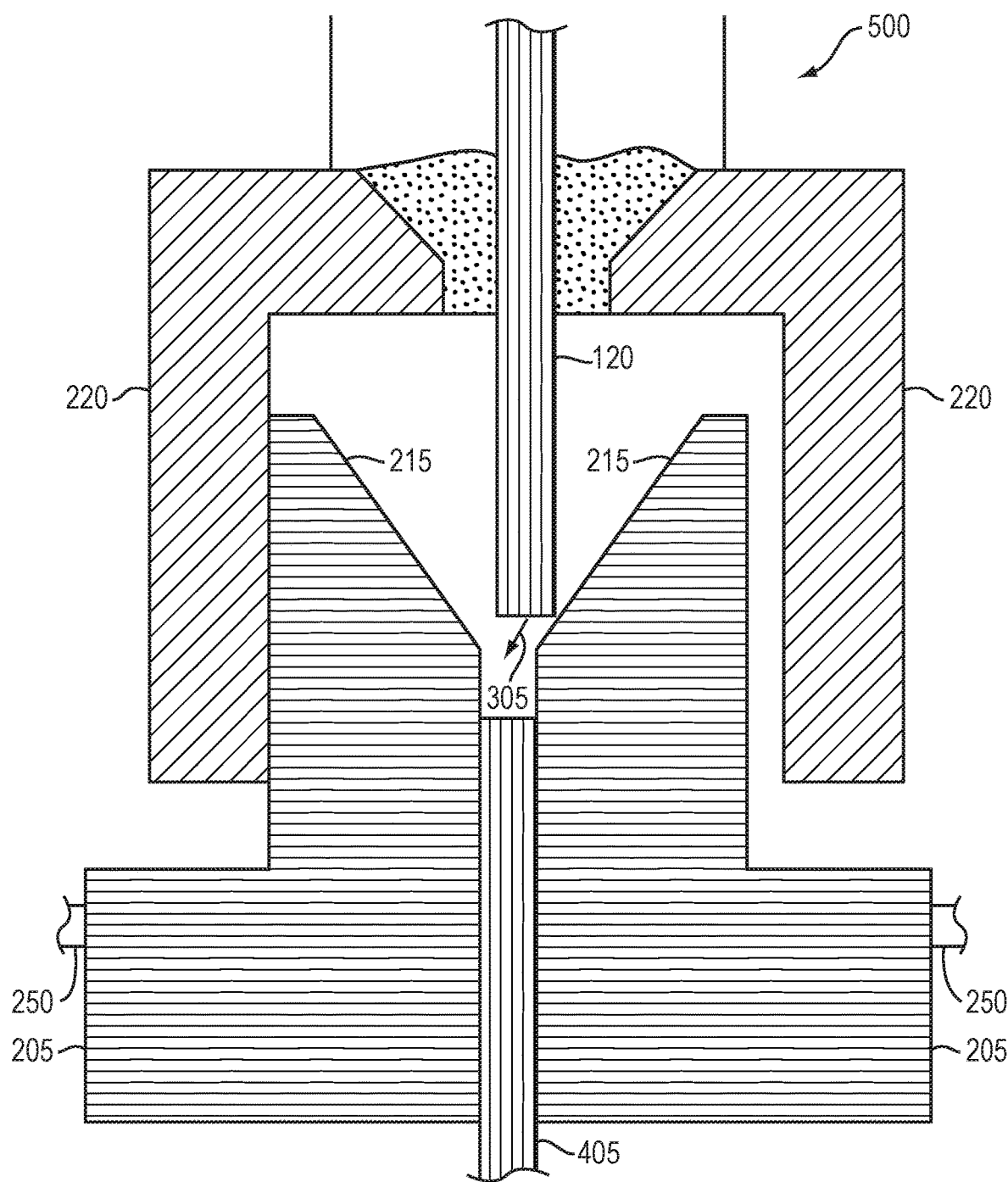
FIG. 5 is a diagram illustrating the insertion of an exemplary connector in accordance with an illustrative embodiment of the present invention.

FIG. 5 is an exemplary diagram 500 illustrating the insertion of an exemplary connector in accordance with an illustrative embodiment of the present invention. As shown in diagram 500, if the jack is misaligned when being inserted into receptacle, the end of the first optical fiber 120 will make contact with the angled surface 215 of receptacle 205. By continuing to insert the jack onto the receptacle, the angled surface will guide the end of the optical fiber 120 into the proper position, i.e., at termination point 240. This lateral motion 305 is enabled by the mechanical interference of the optical fiber 120 and the angled side 215. This lateral motion 305 utilizes the flexible nature of the optical fiber 120 when pressure is applied by a user onto the jack during the insertion process. More generally, a connector made in accordance with embodiments of the present invention may be utilized to quickly align an optical fiber incorporated into a jack component with a pre-defined termination point within the receptacle component of the connector. That is, the connector may utilize mechanical interference of the end of the optical fiber on the angled surface of the interior of the receptacle to cause lateral motion of the end of the optical fiber until it is located at the desired termination point.

It should be noted that the various descriptions and embodiments described herein are exemplary only. While this description has been written in terms of certain materials, it should be noted that, in alternative embodiments, differing materials may be utilized. It should be further noted that the size of various elements in the figures are not drawn to scale for the purpose of enabling better illustration of the concepts described herein. Similarly, the angled surface of receptacle is shown with a particular angle. However, in accordance with alternative embodiments of the present invention, differing angles and/or shapes may be utilized to achieve the desired effect. As such, the description of any specific materials, size, and/or shapes should be taken as exemplary only.

Further, while the present invention has been described in relation to being implemented in a single use device, e.g., being used for a single medical procedure before being discarded, it is expressly noted that the invention is not so limited. In alternative embodiments, the invention may be designed for use in devices that are reused. In other alternative embodiments, the principles of the present invention may be implemented in devices that are designed and configured for a limited number (e.g., 10-15) of uses. Therefore, the description of the principles of the present invention being used in a single use medical device should be taken as exemplary only.

What is claimed is:

1. An apparatus comprising:
   a receptacle with an interior having an angled shape that narrows from an outer opening towards a termination point, the receptable having a first flat surface;
   a jack sized to mate with the receptacle, the jack having a second flat surface, a first optical fiber extending through a flat end portion of the jack so that, when the first flat surface is brought into contact with the second flat surface, a first distal end of the first optical fiber is at the termination point, wherein the jack is a single piece.

2. The apparatus of claim 1 further comprising a plurality of rotatable latches operatively connected to the receptacle, the rotatable latches being rotatable to an open position to allow mating of the jack onto the receptacle and being rotatable into a closed position to secure the jack to the receptacle when mated.

3. The apparatus of claim 1 further comprising a bayonet mount securing the jack to the receptacle.

4. The apparatus of claim 3 wherein the radiation emitter is a laser source.

5. The apparatus of claim 1 wherein the receptacle is affixed to a radiation emitter that is configured to emit radiation to the termination point.

6. The apparatus of claim 1 wherein the receptacle is operatively connected to a second optical fiber, wherein a proximal end of the second optical fiber terminates at the termination point, so that, when the jack and the receptacle are mated, the first distal end of the first optical fiber is aligned with the proximal end of the second optical fiber at the termination point.

7. The apparatus of claim 1 wherein the jack is integrated in a disposable device.

8. The apparatus of claim 1 wherein the jack further comprises a molded housing.

9. The apparatus of claim 1 wherein the jack is integrated into a device intended to be used only a single time.

10. The apparatus of claim 1 wherein the jack is integrated into a device intended to be used no more than ten times.

11. The apparatus of claim 1 wherein the first distal end of the first optical fiber is located at a predefined distance from the second flat surface.

12. An apparatus comprising:
a receptacle having a first flat surface, the receptacle having angled interior sides configured to guide an optical fiber extending from a flat end of single piece jack having a second flat surface, the angled sides shaped so that when the first flat surface is in contact with the second flat surface, an end of the optical fiber is located at a predefined termination point in the receptacle.

13. The apparatus of claim 11 wherein the end of the optical fiber is located at a predefined distance from the second flat surface.

14. An apparatus comprising:
a receptable having a first flat surface, the receptacle having angled interior sides configured to align an optical fiber with a predefined termination point;
a jack having a second flat surface, the jack having the optical fiber extending therefrom, a distal end of the optical fiber being at a predefined distance from the second flat surface, wherein when the first flat surface is in contact with the second flat surface, the distal end of the optical fiber is located at the termination point.

* * * * *